Nov. 1, 1960   L. EDELMANN   2,958,224
THERMOHYDROMETER
Filed Nov. 29, 1954   3 Sheets-Sheet 1
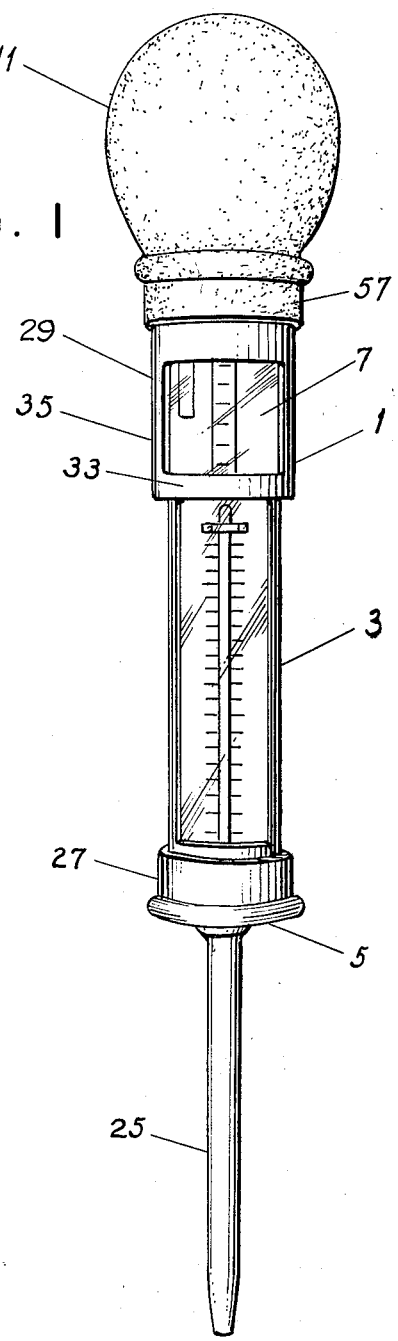
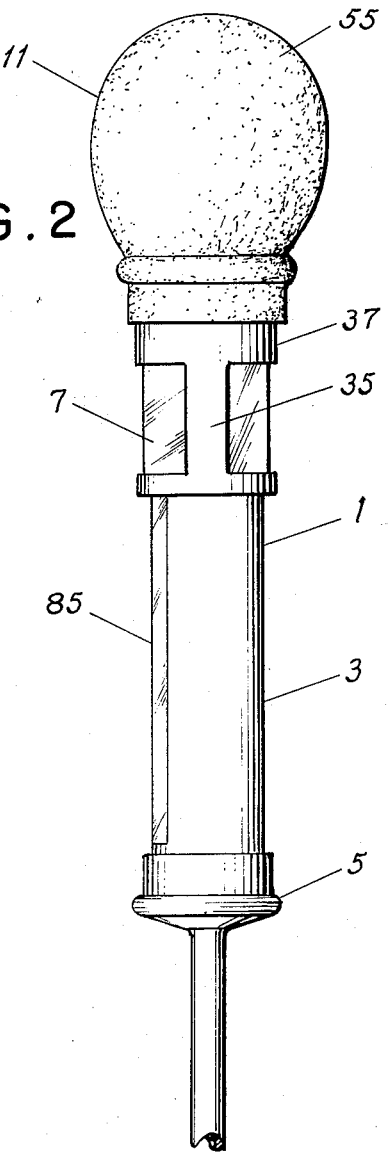
INVENTOR
Leo Edelmann
BY Robert J Patin
ATTORNEY

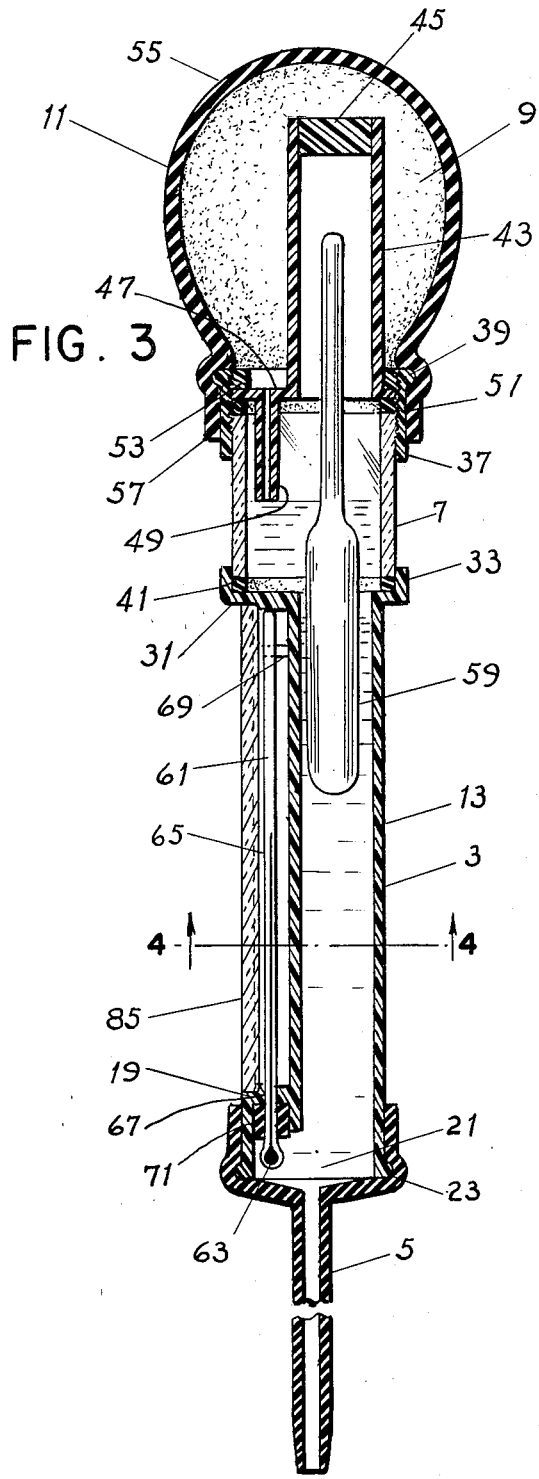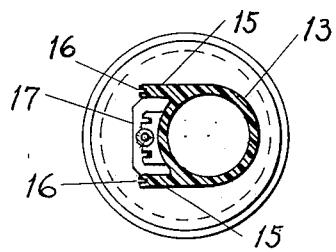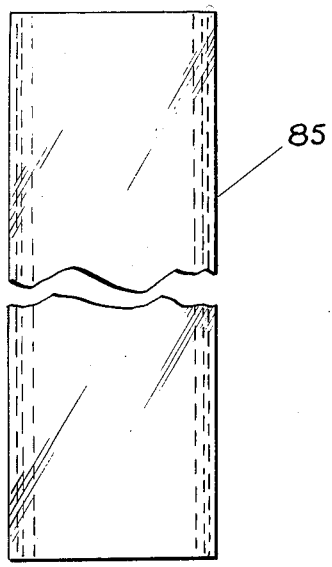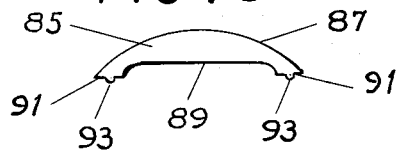
INVENTOR
Leo Edelmann
BY Robert J Patch
ATTORNEY INVENTOR
*Leo Edelmann*
BY *Robert J Patm*
ATTORNEY United States Patent Office 2,958,224
Patented Nov. 1, 1960

2,958,224

THERMOHYDROMETER

Leo Edelmann, 6312 N. Kenmore Ave., Chicago, Ill.

Filed Nov. 29, 1954, Ser. No. 471,603

14 Claims. (Cl. 73—442)

My invention relates to improvements in hydrometers, and more particularly to suction hydrometers of the type ordinarily employed for testing battery acids, radiator solutions and other liquids and solutions.

Heretofore, the art has endeavored to develop hydrometers which would be compact and easy to use and which at the same time would not be subject to breakage in ordinary use. In an early effort to overcome these and other disadvantages, it was proposed to replace a portion of the long glass barrel of hydrometers then in use with a length of less frangible material, as in Edelmann Patent No. 1,245,449, November 6, 1917. Hydrometers of this type were no more compact than the earlier models had been, and were rather awkward to use, but they had the great advantage of reducing breakage in normal use. When it was later proposed to construct thermohydrometers including thermometers having relatively long temperature indicating scales, the problem of providing compactness in the devices was greatly aggravated. It was proposed to mount the thermometers coextensive with the hydrometer barrels, as in Edelmann Patents Nos. 1,923,192, 2,016,193, and 2,043,405; however, although these arrangements afforded some measure of compactness, the resulting glass structures were complicated in design and therefore expensive to manufacture and easy to break. In a later effort to remedy these difficulties, the thermometer portion and barrel portion were mounted in line with a flange providing a bumper therebetween, as in Edlemann Patent No. 2,223,483; but the reduction in breakage was accompanied by an increase in length. Finally, it was proposed to reduce both breakage and length by greatly shortening the length of the glass barrel and fixing the water line or liquid level within the barrel, as in Edelmann Patents Nos. 2,393,522 and 2,393,523. However, these latter developments were expensive to manufacture, awkward to use and frequently subject to leakage.

Although many attempts were made to overcome the foregoing difficulties and other disadvantages, none, as far as I am aware, was entirely successful when carried into practice commercially on an industrial scale.

Accordingly, it is an object of the present invention to provide a syringe hydrometer of the type ordinarily held in the hand and used for testing anti-freeze and battery solutions and the like, which instrument is of such construction that a substantially constant level of liquid is attained for the specific gravity float element, in each instance of use and irrespective of the particular degree of compression and the force applied to the suction bulb, and which at the same time insures that the temperature influenced portions will be subjected to the test quantity of liquid solution.

Another object of the invention is to provide an instrument of this character that can be made relatively short and compact and which will at the same time permit use of a proportionately long float element.

The invention also contemplates providing an improved hydrometer instrument that may have all exterior portions made of plastic, rubber, or other materials of non-frangible character, and materials that will not be readily damaged under ordinary conditions of use or by dropping or other ordinary accidents or shocks to which the instrument may be subjected while being handled and used.

It is a further object of the invention to provide a hydrometer in which the float element and the thermometer, parts of which are now most conveniently of glass, will be housed and protected against breakage and damage, and in which there is no possibility of two glass parts or surfaces or two portions of readily frangible material contacting.

The invention further contemplates providing a hydrometer instrument which is of small size and which is compact and is more or less streamlined, thus avoiding a large cumbersome bulk or structure which can often be used only with greatest difficulty due to the limited space within which batteries, jars and other containers for the liquid to be tested are placed.

It is another object of the invention to provide a hydrometer so constructed that a very short liquid barrel can be employed, the construction insuring that the test quantity of liquid will always be at a predetermined level during the test, and the portions of the float element and thermometer being located and disposed in such relation that these indications can be readily viewed and can be read together in the same field of vision while the instrument is being held with the hand of the user conveniently grasping the bulb for manipulation to draw in and expel the test quantity of liquid.

Still another object of the invention is to provide a hydrometer which will not be subject to leakage in use.

It is likewise within the contemplation of the invention to provide a thermohydrometer in which a major portion of the length of the body thereof will be occupied by temperature and specific gravity indicating means.

It is also the purpose of the invention to provide a a hydrometer in which the tendency of the float element to stick to the sides of the instrument is reduced to a minimum.

Yet another object of the invention is to provide a thermohydrometer in which the thermometer is housed for easy viewing without substantial danger of breakage in use.

Finally, it is an object of the invention to provide a hydrometer so constructed that the parts thereof readily adapt themselves to molding and other commercial production operations tending toward accurate construction and sizing and rapid and inexpensive manufacture.

Other objects and advantages will become apparent from the following description taken in conjunction with the accompanying drawings, in which:

Figure 1 is a front elevational view of a hydrometer according to the invention;

Figure 2 is a side elevational view of the hydrometer of Figure 1;

Figure 3 is a cross sectional view in elevation of the hydrometer of Figures 1 and 2;

Figure 4 is a cross sectional view taken on the line 4—4 of Figure 3 looking in the direction of the arrows;

Figure 5 is a front elevational view of the thermometer lens;

Figure 6 is an end view of the lens of Figure 5;

Figures 7, 8:
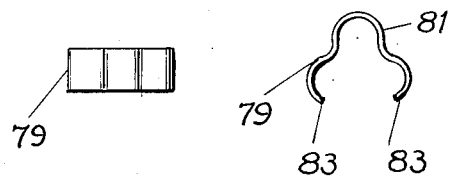
Figure 7 is an elevational view and Figure 8 is a plan view of the thermometer spring retaining clip.

Referring now to the drawings in greater detail, the device consists broadly of a hydrometer 1 comprising a lower housing portion 3, a lower nozzle portion 5, a barrel portion 7, an upper housing portion 9 and a suction bulb 11.

More particularly, lower housing portion 3 is of generally tubular shape, open at both ends, and may be formed of relatively non-frangible material such as hard rubber or a plastic such as polystyrene. Lower housing portion 3 comprises relatively narrow conduit 13 of circular cross section which at its front is provided with tangentially disposed, parallel vertical fins 15, the front surfaces of which are coplanar and provided with vertical grooves 16. Thus, fins 15 define an indentation 17 at the front of lower housing portion 3, which indentation terminates downwardly in a generally horizontal wall 19 which divides the indentation from enlarged portion 21, the front side walls of which form in effect a downward continuation of fins 15. Lower housing portion 3 terminates downwardly in an outwardly directed lip 23.

Lower nozzle portion 5 is also generally tubular in shape, open at its top and bottom, and may desirably be made of soft rubber. It is provided with a relatively narrow, hollow stem portion 25 and with an enlarged coupling flange 27 of a shape generally complementary to the shape of the lower end of lower housing portion 3, so that it may be elastically retained about lip 23.

Barrel 7 consists of a relatively short, imperforate, sleeve-like member of glass, which is received in cage 29. The cage in turn is mounted adjacent the upper end of, and integral with, lower housing portion 3. To this end, a generally horizontal wall 31 is provided at the upper end of housing 3 and terminates in an upwardly directed annular flange 33. Upstanding from flange 33 are integral connector members or webs 35, one on each side; and mounted atop and integral with webs 35 is an anular outer ring 37 which terminates upwardly in outwardly turned lip 39. When barrel 7 is seated in cage 29, it may be spaced from wall 31 by a soft washer 41 of rubber or the like.

Upper housing portion 9 comprises a cylindrical tube 43 sealed at its upper end by plug 45 and surrounded at its lower end by outwardly directed horizontal flange or circular plate 47, with which it is eccentric. Just as tube 43 extends upwardly from plate 47, so also a duct means or tube 49, open at both ends, extends downwardly from the other side of plate 47. The assembly comprising tube 43, plate 47 and tube 49 may if desired be molded integrally from plastic or hard rubber. Plate 47 seats atop barrel 7 and is spaced therefrom by soft washer 51 and is retained thereon by retaining ring 53, provided on its outer periphery with screw threads for screwing engagement with complementary screw threads on the upper interior surface of outer ring 37.

Suction bulb 11, of conventional construction, may be made of soft rubber and is provided with a generally bulb-like body portion 55 and an annular coupling flange 57 which fits on lip 39 to retain the bulb on the hydrometer.

A hydrometer float 59, of conventional construction, is adapted to ride in conduit 13, barrel 7 and tube 43.

A thermometer 61 having a temperature responsive portion or bulb 63 and a temperature indicating portion or elongated portion 65 is adapted to be carried in indentation 17 through a hole 67 in wall 19 at its lower end and a bracket means 69 at its upper end. Soft washer 71 packs about the thermometer immediately below hole 17 to provide a watertight seal between enlarged portion 21 and indentation 17.

Referring now to Figures 7 through 10, it will be seen that bracket means 69 comprises a bracket base 73 which attaches to the forward wall of conduit 13 and is provided centrally thereof with semi-circular indentation 75 for the reception of thermometer 61. A notch 77 is provided at each side of indentation 75 for the reception of spring retaining clip 79, which in turn comprises a semi-circular central portion 81 adapted to fit around the upper end of thermometer 61, and spring clip ends 83 which are adapted to be resiliently spread until they will enter notches 77 and thereafter resiliently retain clip 79 in assembled position.

Figure 9:
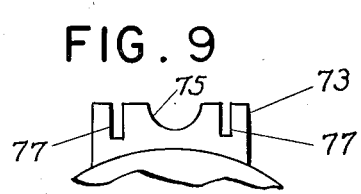
Figure 9 is a plan view and Figure 10 a front elevational view of the thermometer bracket.
Figure 10:
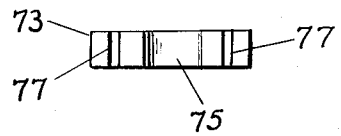

A lens 85, of transparent plastic or glass, may be placed over indentation 17 so as both to protect the thermometer and to magnify the scale thereof. The structure of lens 85, as best seen in Figures 9 and 10, includes a convex face 87 and a flat rear face 89, the two faces coacting together to provide a magnifying lens. Coplanar flattened ends 91 are provided at each side of lens 35; and ridges 93 extend substantially full length of the flattened ends. It will thus be seen that the coplanar ends and the ridges of the lens are complementary to the coplanar ends and grooves of fins 15, so that lens 85 may snap onto fins 15 with ridges 93 resiliently held in grooves 16.

The assembly of the device may proceed as follows: With lower nozzle portion 5 removed, thermometer 61 may be inserted through soft washer 71 and hole 67 a major portion of its length into indentation 17, until the upper end of the thermometer rests in indentation 75. The ends 83 of clip 79 may then be spread and inserted in notches 77 and the clip pushed home to retain the thermometer in place. Lens 85 may then be snapped on.

With the thermometer in place, lower nozzle portion 5 may now be added, it being elastically deformed to fit snugly about the lower end of lower housing portion 3. It will be observed that in assembled position, portion 5 substantially retains thermometer 61 in desired position against accidental displacement.

Float 59 may now be added simply by slipping it into conduit 13. Shoft washer 41 is next placed in the bottom of cage 29 and barrel 7 added atop it. Soft washer 51 is placed on top of barrel 7, then plate 47, and finally retaining ring 53 is screwed down on plate 47 to retain the parts in assembled relation. Tube 43 should be substantially aligned with conduit 13 to provide clearance for float 59. Suction bulb 11 is then added and the assembly is complete.

The operation of the device is as follows: When stem 25 is placed in a liquid to be tested and bulb 11 compressed and released, the suction in the bulb will draw off a test quantity of liquid through stem 25 into enlarged portion 21, up conduit 13 and into barrel 7 to a liquid level or water line predetermined by the lower end of tube 49. All that portion of the interior of the hydrometer above the lower end of tube 49 is sealed off from the suction bulb and from the outside and forms in effect a pressure dome. Accordingly, the liquid cannot rise any higher in the hydrometer; and as a result, any liquid in excess of that required to fill the hydrometer to the fixed or predetermined water level will be sucked up through tube 49 and into bulb 11.

As the liquid rises in the hydrometer, it carries with it float 59, which finally comes to rest with its lower portion in conduit 13 and its upper portion in tube 43 at such a height in the liquid, depending on the specific gravity thereof, as will indicate that specific gravity by the position of the water line relative to the indicia on the upper portion of the float. It will be noted that the relatively small diameter of conduit 13 maintains float 59 in substantially upright position so that the upper end of the float does not contact the walls of tube 43. If it were not so, then the upper end of float 59 would have a tendency to adhere to the walls it touched through the liquid therebetween, thus spoiling the accuracy of the float reading. This construction also has the advantage of preventing contact between float 59, which ordinarily is glass, and glass barrel 7, and thus avoiding a common source of breakage.

It will also be noted that what would otherwise be waste space within bulb 11 has now been utilized for the reception of the upper end of float 59. Moreover, almost the entire length of the hydrometer between bulb 11 and lower nozzle portion 5 is occupied by the means which indicate the specific gravity of the liquid being tested. Thus, most of the side area of cage 29 comprises windows through which barrel 7 is exposed for viewing the hydrometer float; while almost all of the remainder of the length of the hydrometer body is given over to the elongated portion 65 of the thermometer which measures the temperature of the test liquid and thus enables correction of the float reading. Moreover, it will be noted that one of the two windows defined by webs 35 is in substantial vertical alignment with lens 85 so that both the float reading and the temperature reading may be taken without turning the hydrometer. It will also be noted that the other window defined by webs 35 is directly opposite the first window, so that light coming from behind the hydrometer will be utilized to aid in reading the float.

It will also be noted that the glass barrel is extremely simple in construction. Indeed, it may be formed simply by cutting off lengths of ordinary glass tubing. It is not necessary that instrument glass be used, since the barrel is constructed so simply and protected so well by the outstanding contours of cage 29 that it receives very little severe treatment in use. It will be understood, however, that the barrel should be formed of glass or some other transparent substance having similar surface properties, inasmuch as most liquids such as water will not wet properly to the interior surface of a plastic barrel, and on receding from the hydrometer will leave large drops behind which do not drain properly. Moreover, a barrel of transparent plastic would soon become scratched and cloudy, with resultant loss of transparency.

It should also be noted that relatively narrow conduit 13, extending most of the length of lower housing 3, requires that only a minimum quantity of test liquid be drawn into the hydrometer. Moreover, placement of lens 85 in the manner shown completes the desirably smooth curve of lower housing portion 3, thus maintaining the pleasing appearance of the hydrometer and providing an instrument that is easy to handle and operate.

Finally, it should be noted that the arrangement and method of assembly of the parts is quite simple and at the same time guards against leakage of corrosive battery acids or the like to the exterior of the instrument, but that at the same time a hydrometer is provided of which the parts are extremely simple in shape and easy to manufacture yet rugged and durable in operation.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A thermohydrometer comprising a lower housing having a longitudinal indentation along a major portion of the length thereof, a thermometer disposed in said indentation having a temperature indicating portion extending a major portion of the length of said lower housing and terminating downward in a temperature influenced portion within said housing, a short transparent imperforate barrel atop said lower housing, an upper housing atop said barrel and disposed on the side of said thermohydrometer opposite said indentation, a float element adapted to move in said upper and lower housings and said barrel, and suction means communicating with the interior of said thermohydrometer, whereby a test quantity of liquid may be sucked into said lower housing and up into said barrel to a level intermediate the ends of said barrel to view indications of said float element through said transparent barrel.

2. A thermohydrometer comprising a lower housing having a longitudinal indentation along a major portion of the length thereof, a thermometer disposed in said indentation having a temperature indicating portion extending a major portion of the length of said lower housing and terminating downward in a temperature influenced portion within said housing, a short transparent imperforate barrel atop said lower housing, a float element adapted to move in said lower housing and barrel, a suction bulb mounted adjacent the upper end of said barrel, stopper means in the upper end of said thermohydrometer, and duct means disposed on the same side of said thermohydrometer as said indentation and communicating with the interior of said bulb and extending downwardly interiorly of said barrel to a lower terminus intermediate the ends of said barrel, whereby a test quantity of liquid may be drawn by suction into said lower housing and up into said barrel to a level determined by the lower terminus of said duct means for viewing indications of said float element through said transparent barrel.

3. The invention of claim 2, and an upper housing in which said float element is also movable atop said barrel and within said bulb.

4. The invention of claim 3, in which said upper housing is disposed on the side of said thermohydrometer opposite said duct.

5. A thermohydrometer having a short transparent imperforate barrel, a lower housing below said barrel having a longitudinal indentation along a major portion of the length thereof, a thermometer disposed in said indentation and within the contour of the outer surface of said barrel and having a temperature indicating portion extending a major portion of the length of said lower housing and terminating downward in a temperature influenced portion within said housing, an upper housing of lesser diameter than said barrel mounted atop said barrel and disposed on the side of said thermohydrometer opposite said indentation, a float element movable in said upper and lower housings and said barrel, and suction means communicating with the interior of said thermohydrometer, whereby a test quantity of liquid may be drawn into said lower housing and up into said barrel to a level intermediate the ends thereof for viewing indications of said float element through said transparent barrel.

6. The invention of claim 5, in which said suction means comprises a suction bulb mounted adjacent the upper end of said barrel and substantially enclosing said upper housing.

7. The invention of claim 5, and duct means communicating with said suction means and extending downwardly interiorly of said barrel to a lower terminus intermediate the ends of said barrel, whereby said lower terminus determines said level.

8. A thermohydrometer comprising a lower housing, a thermometer having a visible temperature indicating portion extending along a major portion of the length of said lower housing and terminating downward in a temperature influenced portion within said housing, a short transparent imperforate barrel atop said lower housing, an upper housing atop said barrel and disposed on the side of said thermohydrometer opposite said thermometer, a float element adapted to move in said upper and lower housings and said barrel, and suction means communicating with the interior of said thermohydrometer, whereby a test quantity of liquid may be sucked into said lower housing and up into said barrel to a level intermediate the ends of said barrel to view indications of said float element through said transparent barrel.

9. A thermohydrometer comprising a lower housing, a thermometer having a visible temperature indicating portion extending along a major portion of the length of said lower housing and terminating downward in a temperature influenced portion within said housing, a short transparent imperforate barrel atop said lower housing, a float element adapted to move in said lower housing and barrel, a suction bulb mounted adjacent the upper end of said barrel, stopper means in the upper end of said thermohydrometer, and duct means disposed on the same side of said thermohydrometer as said thermometer and communicating with the interior of said bulb and extending downward interiorly of said barrel to a lower terminus intermediate the ends of said barrel, whereby a test quantity of liquid may be drawn by suction into said lower housing and up into said barrel to a level determined by the lower terminus of said duct means for viewing indications of said float element through said transparent barrel.

10. The invention of claim 9, and an upper housing in which said float element is also movable atop said barrel and within said bulb.

11. The invention of claim 10, in which said upper housing is disposed on the side of said thermohydrometer opposite said duct.

12. A thermohydrometer having a short transparent imperforate barrel, a lower housing below said barrel, a thermometer disposed within the contour of the outer surface of said barrel and having a visible temperature indicating portion extending along a major portion of the length of said lower housing and terminating downward in a temperature influenced portion within said housing, an upper housing of lesser diameter than said barrel mounted atop said barrel and disposed on the side of said thermohydrometer opposite said thermometer, a float element movable in said upper and lower housings and said barrel, and suction means communicating with the interior of said thermohydrometer, whereby a test quantity of liquid may be drawn into said lower housing and up into said barrel to a level intermediate the ends thereof for viewing indications of said float element through said transparent barrel.

13. The invention of claim 12, in which said suction means comprises a suction bulb mounted adjacent the upper end of said barrel and substantially enclosing said upper housing.

14. The invention of claim 12, and duct means communicating with said suction means and extending downwardly interiorly of said barrel to a lower terminus intermediate the ends of said barrel, whereby said lower terminus determines said level.

References Cited in the file of this patent

UNITED STATES PATENTS

| | | |
|---|---|---|
| 1,748,596 | Christie et al. | Feb. 25, 1930 |
| 1,790,696 | Bridge | Feb. 3, 1931 |
| 2,127,065 | McClure | Aug. 16, 1938 |
| 2,256,019 | Eden | Sept. 16, 1941 |
| 2,320,417 | Edelmann | June 1, 1943 |
| 2,368,123 | Edelmann | Jan. 30, 1945 |
| 2,393,522 | Edelmann | Jan. 22, 1946 |
| 2,410,031 | Hoyer | Oct. 29, 1946 |